Patented Dec. 1, 1936

2,062,743

UNITED STATES PATENT OFFICE 2,062,743

PRODUCTION OF FLUORINE-CONTAINING CARBON COMPOUNDS

Herbert Wilkens Daudt and Mortimer Alexander Youker, Wilmington, Del., assignors to Kinetic Chemicals, Inc., Wilmington, Del., a corporation of Delaware Application June 12, 1935, Serial No. 26,280

26 Claims. (Cl. 260—162)

This invention relates to fluorine derivatives of organic compounds, and more particularly to the preparation or regeneration of the active agent used in producing the desired product. It especially contemplates a practical process for the fluorination of organic halogen compounds with hydrogen fluoride.

This application is a continuation-in-part of our co-pending application Serial No. 717,514 filed March 26, 1934 which, in turn, is a continuation-in-part of our U. S. applications Serial Nos. 483,289 filed September 20, 1930; 628,154 filed August 10, 1932; 631,162 filed August 21, 1932; 686,618 filed August 24, 1933; and 692,696 filed October 7, 1933. These applications have matured into U. S. Patents Nos. 2,005,710, 2,005,705, 2,005,706, 2,005,707, 2,005,708 and 2,005,709, respectively.

This invention has for an object the provision of a novel fluorinating process which is more simple than known processes for fluorinating organic compounds. Further objects are the production of economic and commercial processes for the production of organic fluorine compounds. An additional object is the preparation of carbon compounds containing both fluorine and hydrogen and which may or may not contain other halogen atoms. A still further object is to provide a method of introducing fluorine and of substituting halogen for hydrogen in halogenated hydrocarbons containing hydrogen. Other objects will appear hereinafter.

These objects are accomplished by the present invention, certain embodiments of which are disclosed by the processes hereinafter described and the apparatuses illustrated in the accompanying drawings in which Fig. 1 is a side view partly in section and somewhat diagrammatic of one form of apparatus for carrying out the invention;

Similar characters refer to similar parts throughout the drawings.

In general, this invention comprises reacting a compound containing hydrogen and at least one acyclic carbon atom having attached thereto at least one atom of a halogen other than fluorine (that is, a halogen having an atomic weight greater than 19) with hydrogen fluoride in the presence of a catalyst such as an antimony compound. This may be done conveniently in a reactor such as that shown, A (Fig. 1) or H (Fig. 2). As a result of this reaction, the acyclic compound has a part or all of its halogen content (other than fluorine) replaced by fluorine. The resultant gaseous fluorinated acyclic product, together with any hydrogen halide formed or present, is then led into a scrubber filled with some material capable of removing the hydrogen halide. This may conveniently be a container filled with a solution of caustic alkali, milk of lime, or the like, as shown at B (Fig. 1) and L (Fig. 2). If desired, the mixed gases before being passed through the hydrogen halide remover may be passed through a washer (shown at K in Fig. 2) containing some of the acyclic compound being treated. This washer serves to collect any of the antimony compound (or other catalyst) which might leave the reactor. This washer may also permit further interaction between the compounds entering into the reaction. In certain cases, it is advantageous to employ two or more washers at this point, usually maintained at progressively lower temperatures.

In the case where aqueous scrubbing agents are used to remove the hydrogen halides from the fluorinated acyclic product, the theretofore dry gas may become mixed with water vapor. Subsequently, it may be conveniently dried by passing through a drying scrubber such as shown at C (Fig. 1) or M (Fig. 2). This scrubber will ordinarily contain sulphuric acid, stick caustic, or the like. For convenience of storage and transportation the resultant dry-neutral-fluorinated-acyclic-product may be liquefied.

This liquefaction may be accomplished by passing the gaseous product through a condenser such as shown at D (Fig. 1) and N (Fig. 2). Following its condensation, the liquefied product may be run into storage containers such as illustrated at E (Fig. 1), P (Fig. 2) and R (Fig. 2).

The invention will be readily understood from the following detailed description. For convenience, the process is described in connection with specific compounds, namely, carbon tetrachloride (the acyclic halogen compound) and antimony pentachloride (the catalyst).

Figure 1:
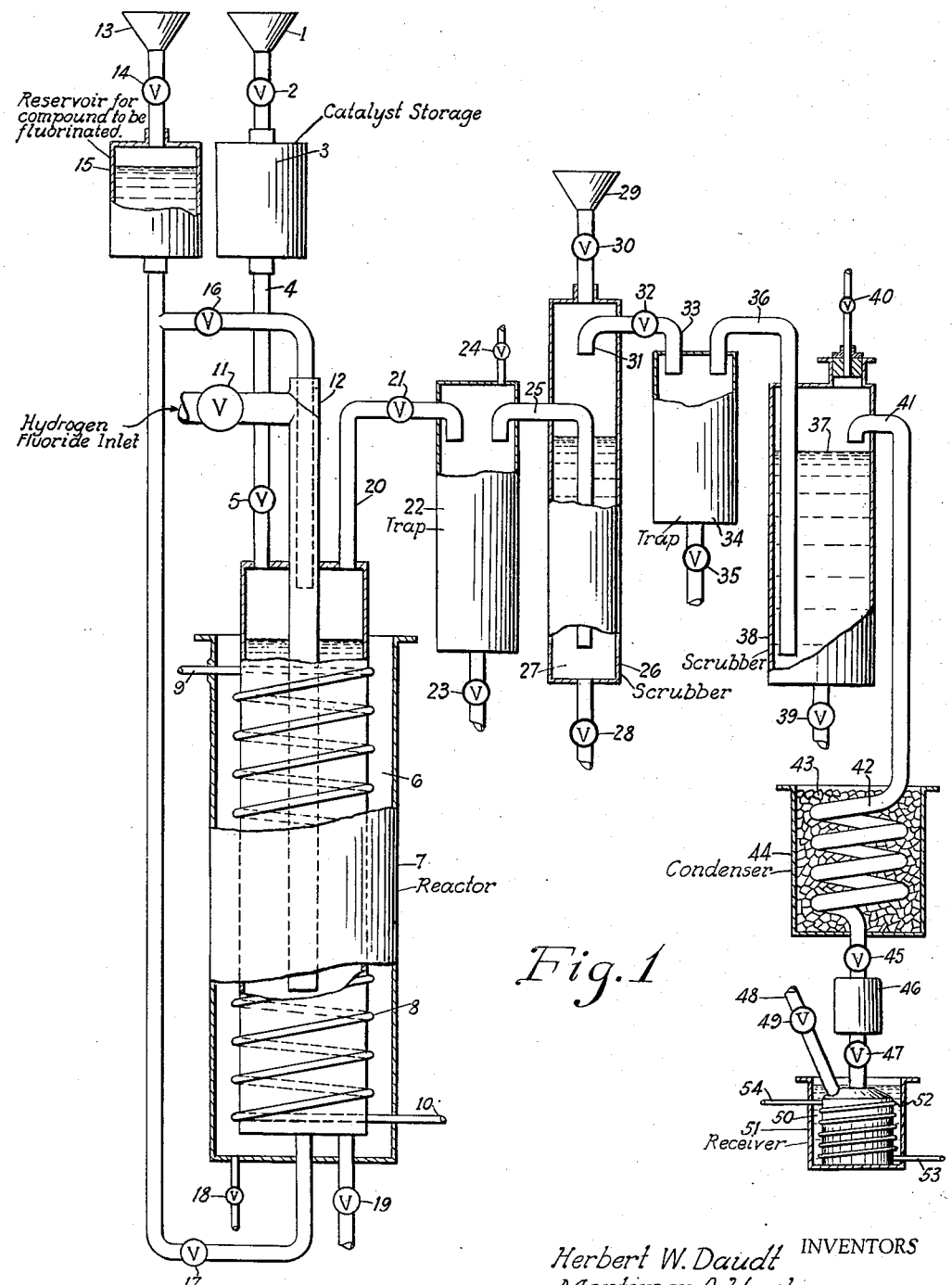
Figure 2:
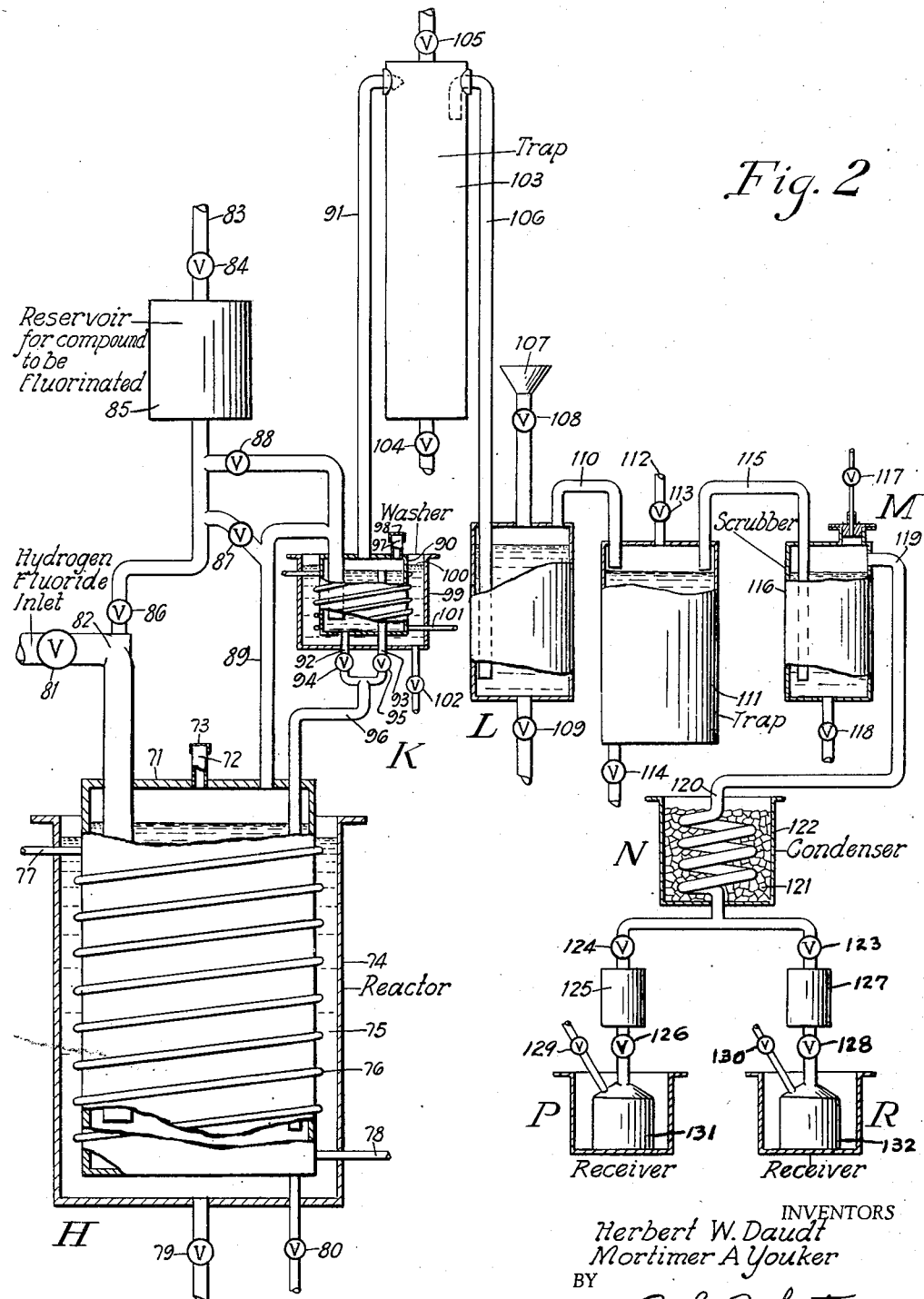
Fig. 2 is a similar view of a modified form of apparatus.

Referring to Fig. 1, antimony pentachloride is run into reactor A until the desired level is reached. This addition is made through funnel 1, valve 2, reservoir 3, line 4, and valve 5. When the desired liquid level in the reactor has been reached, valve 5 is closed.

The reactor A comprises an inner container surrounded by an oil bath 6 in an outer container 7.

This oil bath is utilized to maintain constant the temperature of the reacting components in the inner container. The temperature of the oil bath is, in turn, regulated by means of a heating coil 8 which is shown coiled about the inner container and connected with a suitable inlet for heated material (for example, steam) through line 9 and connected with a suitable outlet through line 10. The outer container may be emptied through valve 18 when desired. The inner container has a bottom outlet through valve 19. In the place of oil, other liquids such as dichlorobenzene or a polychlorodiphenyl may be used. In certain instances the oil bath may be eliminated and the heating carried out by the use of steam (or other suitable vapor) in a jacket that surrounds the catalyst vessel. The catalyst may, if desired, be heated electrically.

Before starting the reaction, the inner container is filled with antimony pentachloride to the desired depth as described above. Thereafter, hydrogen fluoride and carbon tetrachloride are passed into the antimony pentachloride simultaneously or, if desired, intermittently.

In such a process valve 11 having been opened and the flow of hydrogen fluoride started into the reactor, either or both of valves 16 and 17 are opened to allow carbon tetrachloride from the reservoir 15 to flow into the reactor. The fluorinated product is given off continuously. The supply of carbon tetrachloride in the reservoir 15 may be replenished through funnel 13 and valve 14. It is of special advantage to keep the antimony-containing substance in a liquid, or nearly liquid condition at all times.

It is probable that the reaction taking place in reactor A produces some of each of the compounds $CCl_3F$, $CCl_2F_2$ and $CClF_3$. In any event, by proper regulation of the temperature of the reaction, time of reaction, time of contact of materials, relative proportions of the ingredients, etc., the production of the desired compounds is maintained at a maximum.

The mixture of the fluorinated product (which itself may or may not be a mixture) and hydrogen chloride containing small proportions of unconsumed carbon tetrachloride and hydrogen fluoride, leaves the reactor A through line 20.

The mixed gases pass through valve 21 into a trap 22. This trap has a vent at 24 and bottom outlet at 23. The gases leave the trap through line 25 and pass into a body of aqueous alkali metal hydroxide 27 in container 26 comprising scrubber B. This scrubber has a bottom outlet through valve 28 and may be filled through funnel 29 and valve 30. The neutral fluorinated product leaves this scrubber through line 31 and passes through valve 32 and line 33 into a second trap 34 which has a bottom outlet at 35.

The gases leave trap 34 through line 36 and pass therefrom through a body of sulphuric acid (or other drying agent) 37 in a container 38 constituting drying scrubber C. Scrubber C has a vent through gate valve 40 and a bottom outlet through valve 39. The gases, after being dried, may be disposed of as desired, but ordinarily they are condensed, for example, by passing through line 41 into coil 42 surrounded by a suitable refrigerant (such as solid carbon dioxide) indicated at 43 and held in container 44, all of which constitutes condenser D.

The liquefied product runs through valve 45 and separable connection 46 into a storage container generally indicated at E. The illustrated storage container has one opening through valve 47 into the separable connection 46 and another through line 48 and valve 49. While being filled, the storage container is maintained in cooling bath 50 of some suitable substance (for example, alcohol), the temperature of which is maintained at the desired figure by a suitable refrigerant (for example, carbon dioxide), circulating in coil 52 surrounding the storage receptacle in container 51. The refrigerating coil has an inlet 53 and outlet 54.

When the storage receptacle is full, it may be replaced by an empty receptacle without loss of the product by closing valve 45 before opening the separable connection 46.

Obviously, before separating the full container valve 47 will be closed. The valve 49 is, of course, kept closed during the storage of the container.

Under some operating conditions with the apparatus of Fig. 1, volatilization of antimony halides causes clogging of the delivery line (20) from reactor A. These difficulties have been overcome by modifying the apparatus as illustrated by Fig. 2. The essential features of the last-named equipment involve means for the removal of the volatilized antimony halides. The washing of the vapors through carbon tetrachloride serves to remove the antimony halides from the fluorinated product before it (the fluorinated product) passes to the caustic scrubber. The addition of a portion of the carbon tetrachloride to the reactor by means of the vapor line 89 (Fig. 2) from the reactor, has been found to keep this line clear from detrimental deposits of antimony halide.

In the modification of the apparatus shown in Fig. 2, the reactor H comprises an inner container 71 surrounded by a heating coil 76 and an oil bath 75 in an outer container 74. The inner container has a bottom outlet through valve 80 and the outer container has a bottom outlet through valve 79. The heating coil is connected through inlet 77 to a suitable source of heated material (not shown) and has an outlet through line 78. This reactor operates similarly to reactor A of Fig. 1, described above. It may be filled with antimony pentachloride through line 72. When it has been filled to the desired depth, line 72 is closed by cap 73. At the desired time, hydrogen fluoride may be added through valve 81 and line 82.

In the apparatus of Fig. 1, the vaporized reaction product, containing the fluorinated compound or compounds and hydrogen chloride, passes from reactor A into trap 22 prior to entering scrubber B.

In Fig. 2, the mixed gases pass through line 91 into a corresponding trap 103 but, before entry to line 91, the gases pass through a washer generally indicated at K. This washer consists of an inner container 90 surrounded by a cooling bath 100 and a cooling coil 101 in outer container 99. The inner container has a top opening through line 97 which is closed by cap 98. In the operation of the process the inner container is filled to the desired level with carbon tetrachloride (or the particular acyclic halogen compound being treated).

Carbon tetrachloride is admitted to the reactor H simultaneously with the hydrogen fluoride. The resulting fluorinated product and the hydrogen chloride leave the reactor through line 89 and are washed by passing through the body of carbon tetrachloride in washer K, after which they enter line 91 and pass through the succeeding parts of the apparatus which are similar to the parts shown in Fig. 1.

Carbon tetrachloride may be admitted to the reactor H in several ways. The source of supply (not shown) is connected to reservoir 85 through line 83 and valve 84. The line leaving the reservoir 85 divides into three lines containing valves 86, 87 and 88, respectively. The valve 86 permits the flow of the carbon tetrachloride into the reactor H through the hydrogen fluoride line (similarly to valve 16 in Fig. 1). Valve 87 allows the carbon tetrachloride to enter the reactor H through line 89 (the line by which the gaseous products of the reaction leave). As disclosed above, entry through this line allows the carbon tetrachloride to flow counter-current to the issuing gases, and thereby wash them. This washing results in carrying back into the reactor any antimony compounds which might otherwise deposit in line 89.

Valve 88 allows the filling of the washer K with carbon tetrachloride. The washer K has two outlets 92 and 93 through valves 94 and 95, respectively. The outlets are connected to one line 96 which extends down into reactor H. The purpose of these outlets may be explained as follows: When it is desired to operate the washer K on a batch principle, valves 94 and 95 are maintained closed. When the batch of carbon tetrachloride used for washing is undesirably contaminated, valve 94 is opened and the batch of carbon tetrachloride is dropped into the reactor H through line 96. If desired, in order to maintain a better controlled feed of scrubber liquid to the catalyst, a weigh scale (not shown) may be placed in the line 96 between the scrubber K and the catalyst vessel H. When it is desired to operate the washer K continuously, valve 94 is kept closed and valve 95 opened. Carbon tetrachloride is continuously admitted through valve 88 and the overflow through line 93 runs into reactor H. As stated above, the admission of carbon tetrachloride to reactor H can be made in a number of ways as will be obvious from the above description. If desired, it may be made through any one, any two, or all three of the valves 86, 87 and 88.

The carbon tetrachloride in the washer K retains a portion of the fluorinated product, which is consequently fed back to the reactor along with the carbon tetrachloride flowing through the washer to the reactor. It will be obvious that with this invention and the apparatus described it is possible to further fluorinate intermediate or partially fluorinated products.

The fluorinated product and hydrogen chloride leave the washer K through line 91 passing into trap 103 and passing out through line 106. This trap has a vent through valve 105 and a bottom outlet through valve 104.

From line 106 these gases pass through the hydrogen halide-removing substance (conveniently sodium hydroxide) in the scrubber L. This scrubber has a bottom outlet through valve 109 and may be filled through funnel 107 and valve 108.

The neutral gas leaves scrubber L through line 110 and passes through trap 111 into line 115. This trap has a vent 112 through valve 113 and has a bottom outlet through valve 114.

Through line 115 the gases pass through a quantity of drying material (for example, sulphuric acid) in scrubber M. This scrubber comprises a container 116, a vent through valve 117, and a bottom outlet through valve 118.

The dry neutral gas leaves scrubber M through line 119 and passes into a condenser N, comprising coil 120 surrounded by a suitable refrigerant, indicated at 121 in container 122.

For convenience of operation, the condenser N is connected with two storage receptacles P and R. The convenience referred to is that of filling one of the two receptacles while an empty container is being substituted for the other, which is full. The condenser is connected to receptacle P through valve 124, separable connection 125 and valve 126. It is also connected to storage container R through valve 123, separable connection 127 and valve 128. Containers P and R are maintained at the proper temperature by a suitable refrigerant (for example, solid carbon dioxide) maintained in suitable vessels 131 and 132. Container P has, in addition to outlet through valve 126, another outlet through valve 129. Container R similarly has an outlet through valve 130.

Figure 3:
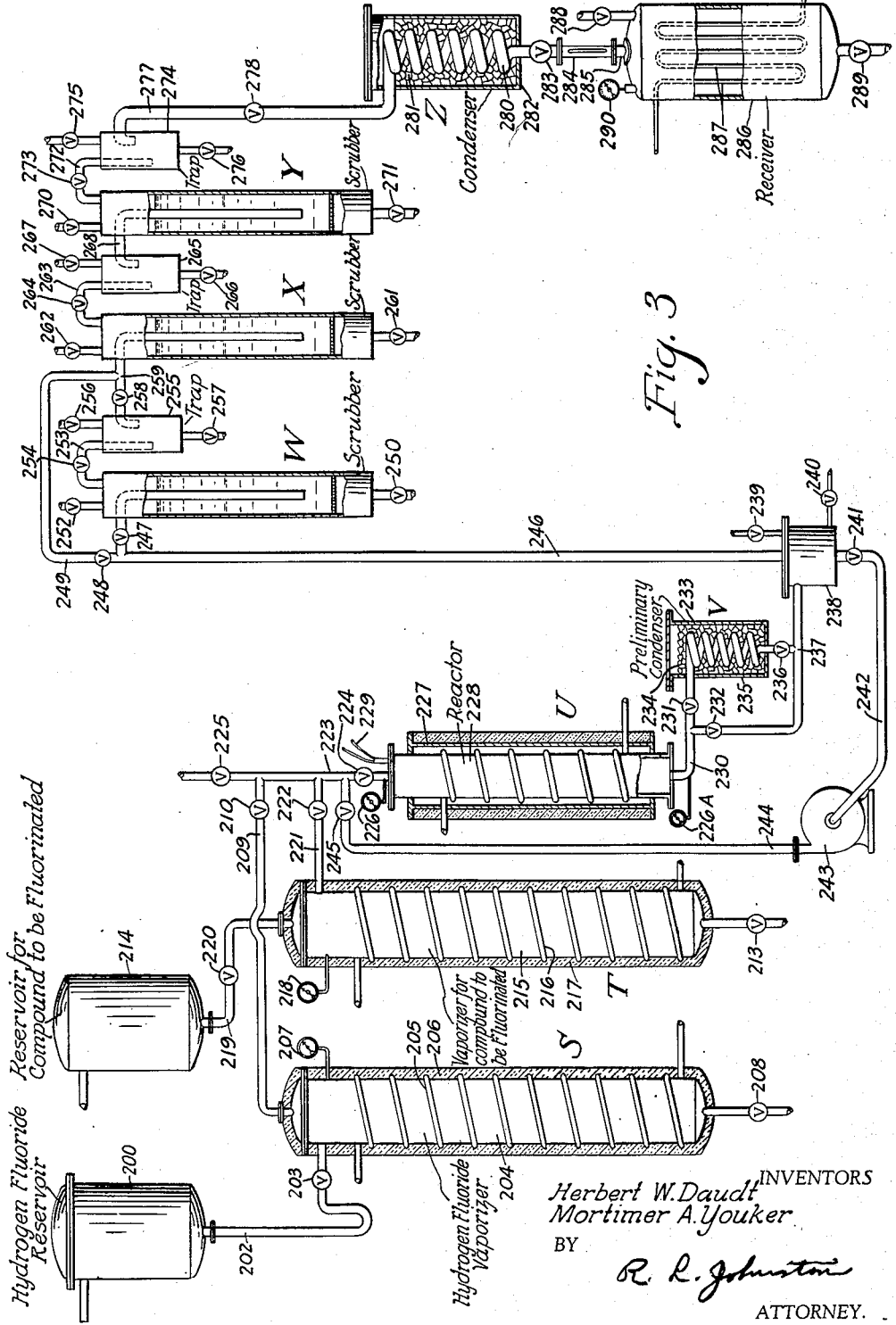
Fig. 3 is a view partly in section, with parts broken away, and more or less diagrammatic of another form of apparatus for carrying out the invention.

Fig. 3 illustrates a type of apparatus which is especially desirable when the catalyst is a solid. The process may be described as follows:

Hydrogen fluoride from reservoir 200 is introduced into the vaporizer S through line 202 and valve 203. Vaporizer S consists of a container 204 surrounded by heating coils 205 and lagging 206, and provided with a pressure gauge 207 and a valved bottom outlet 208.

The compound to be fluorinated (e. g., carbon tetrachloride) is introduced from reservoir 214 into vaporizer T through line 219 and valve 220. Vaporizer T is similar in construction to vaporizer S and consists of a container 215 surrounded by heating coils 216 and lagging 217, and provided with a pressure gauge 218 and a valved outlet 213. Under ordinary operating conditions the valves 208 and 213 are closed.

The gaseous compound to be fluorinated from vaporizer T passes through line 221 and valve 222 into line 223 and there mixes with hydrogen fluoride vapor introduced into line 223 from vaporizer S through line 209 and valve 210. The gaseous mixture then passes through valve 224 into the reactor U containing therein a suitable amount of the catalyst (e. g., a ferric chloride-charcoal catalyst) maintained at the desired reaction temperature. If desired, a halogen and/or the reactants, compressed or otherwise, may be introduced into the reactor by way of valved inlet 225, line 223 and valve 224.

The reactor U consists of a tube 228 provided with heating means such as, for example, an electrical furnace 227 and a thermo-couple or other suitable temperature indicating device 229. The catalyst is disposed on the inside of the tube 228. This tube may or may not be full of catalyst. Thus, a part of the space may be free or occupied by a material which has no catalytic effect. The inlet and outlet pressures are determined by means of gauges 226 and 226—A, respectively.

By proper regulation of conditions such as temperature and pressure of the reaction, time of contact of the reactants with the catalyst, and relative proportions of the ingredients, etc., the production of the desired compound or compounds is maintained at a maximum.

The mixture of the fluorinated product (which itself may or may not be a mixture) and hydrogen chloride containing any unconsumed raw material and hydrogen fluoride leaves the reactor U through line 230. The mixed gases pass through valve 231 (valve 232 being closed) into a preliminary condenser V comprising coils 233 surrounded by a suitable refrigerant indicated at 234 and held in container 235. The condenser temperature is regulated to liquefy a part of the unconverted reactants and, if desired, some of the reaction products. The liquid product and the gaseous fluorinated product and hydrogen halide then pass through valve 236 and line 237 into trap 238. This trap is provided with a valved vent 239 and two bottom outlets controlled by valves 240 and 241. Liquids falling to the bottom of the trap may be removed through the outlet 240 or, if desired, may be passed through valve 241 and line 242 to pump 243 and recycled through line 244 and valve 245 for use again in the process. This circulation may be intermittent or continuous, as desired.

The gaseous fluorinated product and hydrogen halides leave trap 238 through line 246 and pass through valve 247 (valve 248 being closed) into a water scrubber W. This scrubber is provided with a valved inlet 252 and a valved outlet 250 which may be regulated as desired. By passage of the gases through this scrubber some of the hydrogen halides are removed. The remaining gases pass through line 253 and valve 254 into a trap 255 provided with a valved vent 256 and a valved outlet 257. From trap 255 the gases pass through valve 258 and line 259 into a scrubber X containing a body of aqueous alkali metal hydroxide. This scrubber is of the circulating type. It has a bottom outlet through a valve 261 and may be filled through a valved inlet 262.

The substantially neutral gas leaves scrubber X through line 263 and valve 264 and passes through trap 265 into line 268. This trap has a bottom outlet through valve 266 and a vent through valve 267. From line 268 the gas passes through a quantity of drying material (for example, sulphuric acid in scrubber Y). Scrubber Y is also of the circulating type having a valved inlet 270 and a bottom outlet through valve 271.

The dry neutral gas leaves scrubber Y through line 272 controlled by valve 273 and passes through a trap 274 provided with a vent through a valve 275 and a bottom outlet through valve 276. From trap 274 the gas passes through line 277 and valve 278 to a condenser Z comprising a coil 280 surrounded by a suitable refrigerant indicated at 281 in container 282. The condensate passes through valve 283, sight-glass 284 and line 285 into a storage vessel 286 cooled to the proper temperature by a suitable refrigerant circulated in coils 287. The storage vessel is also provided with a valved vent 288, a valved outlet 289 and a pressure gauge 290.

According to a modification of the above described process the gaseous products from reactor U may be treated directly for the removal of hydrogen halides without preliminary condensation in condenser V. This may be conveniently effected by closing valves 231 and 236 and opening valve 232, thereby allowing the reaction products to pass directly through valve 232 and line 237 into trap 238. Whether or not the preliminary condenser V is by-passed in the manner described, it may be desirable, according to another modification of the process to by-pass water scrubber W and thereby introduce the reaction products directly into scrubber X where they are treated with an alkaline reagent. This may be conveniently accomplished by closing valves 247 and 258 and opening valve 248. As a result, the gaseous fluorinated product in line 246 passes through valve 248 into line 249 and thence into line 259 and scrubber X, by-passing scrubber W and trap 255.

As another modification of the process, the crude gaseous fluorinated product from reactor U may be scrubbed through a liquid consisting of the material being fluorinated or of some intermediate fluorinated product maintained at a suitable temperature. This may be accomplished, for example, by replacing the preliminary condenser V by a scrubber (not shown) partially filled with carbon tetrachloride (or other raw material to be fluorinated). Circulation of the scrubbing liquid from the scrubber to the reactor may be effected by a pump in the manner described for circulation of the condensate from the preliminary condenser V to reactor U.

It will be understood that other expedients and varying methods of procedure of a character apparent to those skilled in the art may be employed in any of the procedures described. The forms of apparatus shown are merely conventionally illustrated and may vary widely in details well known in the industry. Various types of scrubbers are suitable. Certain advantages attend the use of two or more scrubbers in series. Preferably, their temperatures are, in the order determined by the flow of the fluorinated products, progressively lower. Obviously, the various traps should be sufficiently large to collect liquids which may escape or flow from the scrubbers or condensers.

The materials of construction of the apparatus may vary not only with the reactants but, also, with the conditions of reaction, particularly temperature and pressure. Those portions of the apparatus which come into contact with the hydrogen halides and antimony pentahalide present during the reaction have been ordinarily made of some corrosion-resistant material. In the apparatuses shown in Figures 1 and 2, those parts up to the hydrogen halide remover have been constructed of copper. We have found that good results may be obtained, even at elevated temperatures and pressures, with materials of construction such as chromium alloy steels, chromium-nickel alloy steels, molybdenum-containing alloy steels, and Monel metal. Steels containing about 18% chromium and 8% nickel have been advantageously used. Mild steel, cold rolled steel, and cast iron have given reasonably satisfactory service. It is known that glass should not be used in contact with hydrofluoric acid; however, it has been found that when some of the processes of this invention are operated on a small scale, glass may be used for the reactor and subsequent parts with satisfactory results.

In certain instances, it may be desirable to make the hydrogen halide removers of materials similar to those mentioned above, or it may be desirable to construct the hydrogen halide scrubbers of phenol formaldehyde condensation products, of lead or of similar material. After the corroding materials have been removed from the gas stream, ordinary materials of construction may be used, for example, cast iron, wrought iron, steel, and the like.

The invention will be further understood from a consideration of the following examples, in which the quantities are stated in parts by weight.

*Example I*

Referring to Fig. 2, 500 parts (25 mols) of gaseous, substantially dry hydrogen fluoride were passed rapidly and steadily into reactor H over a period of twenty-five hours. The reactor contained 600 parts of antimony pentachloride which is maintained at a temperature of about 60° C. During this time 1925 parts (12½ mols) of carbon tetrachloride were run into the reactor H by way of reservoir 85, valve 88, line 93, valve 95 and line 96. The carbon tetrachloride washer K was maintained at a temperature of about 0° C. The condenser N and the receivers P and R were held at about −60° C. by a suitable refrigerant. The product was subjected to fractional distillation.

The combined yield (based on carbon tetrachloride) of fluorotrichloromethane and difluorodichloromethane was about 90%. The product contained about 60% of the difluorodichloromethane and about 40% of the fluorotrichloromethane.

*Example II*

A cylindrical copper vessel was provided with metal inlets for the introduction of hydrogen fluoride and hexachloroethane, and a water-cooled reflux condenser. The hydrogen fluoride inlet extended to the bottom of the vessel.

Six hundred parts of antimony pentachloride were placed in the vessel and 50 parts of anhydrous hydrogen fluoride were added. Forty (40) parts of hexachloroethane were added, and the mixture heated to 100° C. for two hours. At first, a sublimate formed in the lower part of the condenser. As the heating progressed, this substance changed from a fairly high-melting material to a low-melting material.

During the subsequent hour, 20 parts of hydrogen fluoride and 20 parts of hexachloroethane were added and the heating continued for an hour. The material collecting in the lower part of the condenser became more and more liquid as the reaction progressed. The reflux condenser was removed and the reaction mass slowly heated to 150° C. The vapors were condensed in a water-cooled condenser and the liquid collected in a suitable vessel. This liquid was extracted with aqueous hydrochloric acid and then with water. Upon fractional distillation, it was found to consist of a mixture of trifluorotrichloroethane (B. P. about 47° C.) and difluorotetrachloroethane (B. P. about 92° C.).

In a similar operation to that described above, the completed reaction mass was not heated above 100° C., but was carefully drowned in water. The semi-solid, insoluble material was extracted with warm aqueous hydrochloric acid and water. It was found to consist primarily of difluorotetrachloroethane.

*Example III*

The reactor H (Fig. 2), the scrubber K and the feeding equipment illustrated by Fig. 2 were constructed so as to stand pressures of at least 100 pounds per square inch. A valve (not shown) was placed in the line 106 between the trap 103 and the alkaline scrubber L. All pieces of equipment which were subjected to pressure were provided with suitable gauges and safety devices.

Two thousand (2000) parts of antimony pentachloride were added to the reactor and the equipment was closed. The charge was heated to 88° C. to 94° C. Hydrogen fluoride was fed from a reservoir (not shown) maintained at a pressure of 85 pounds per square inch, through valve 81 and line 82. The valve (not shown) was kept closed until the pressure of the reactor and scrubber K reached 50 pounds per square inch. This pressure was then released to 45 pounds, and this pressure maintained during the remainder of the operation. The temperature was maintained at 88° C. to 94° C. for the remainder of the operation. The scrubber K was maintained at about 30° C.

Both carbon tetrachloride and hydrogen fluoride were subsequently fed to the equipment. Preferably, the carbon tetrachloride was fed to scrubber K, from which it over-flowed to the reactor. The rate of feed of the carbon tetrachloride was 450 parts per hour; that of the hydrogen fluoride was 125 parts per hour.

The remainder of the operation was carried out as described in Example I.

A product containing about 75% difluorodichloromethane and 20% fluorotrichloromethane was obtained. There were also present small quantities of trifluorochloromethane. The yield of fluorinated products was 90% to 95% of theory.

*Example IV*

The equipment described in Example III was used. Except for the interrupted feeds of the materials, the operation was also similar to that described in Example III.

Two thousand (2000) parts of antimony pentachloride and 300 parts of antimony trichloride were added to the reactor. Three hundred (300) parts of hydrogen fluoride were added to the reactor. During this operation the pressure was maintained at 75 pounds per square inch by means of the valve (not shown). The temperature of the reactor during the above operation and during the subsequent addition of carbon tetrachloride was maintained between 88° C. and 94° C.

A total of 800 parts of carbon tetrachloride were gradually added to the reactor. The pressure during this operation was maintained at 45 to 50 pounds per square inch.

As in Example III, the product consisted primarily of a mixture of difluorodichloromethane and fluorotrichloromethane. Small quantities of trifluorochloromethane and carbon tetrachloride were also present.

*Example V*

Three hundred (300) parts of antimony pentachloride contained in a metal vessel were treated with 40 parts of anhydrous hydrogen fluoride at a temperature of 75° C. To this mixture there were added 8.7 parts of perchloroethylene. The resulting mixture was maintained at 100° C. for five hours under a water-cooled copper reflux condenser. The reflux condenser was removed and the mixture gradually heated to 150° C. The vapors from this operation were condensed by means of a water-cooled condenser and collected in a suitable receiver. The condensate was washed successively with aqueous hydrochloric acid and water, both of which were maintained at a temperature of 30° C. to 35° C. By distillation there was obtained a mixture of difluorotetrachloroethane (B. P. about 92° C.) and trifluorotrichloroethane (B. P. about 47° C.).

*Example VI*

In the apparatus used in Example V there were added 300 parts of antimony pentachloride and 20 parts of hydrogen fluoride. To this mixture, held at 80° C., there were slowly added 16 parts of perchloroethylene and 7 parts of chlorine. Subsequently, the reaction mixture was held at 80° C. for two hours. The mass was then allowed to cool, when it almost entirely solidified.

The cooled mass was gradually added to an excess of aqueous hydrochloric acid, with which it was stirred energetically. The acid was removed and the more or less pasty mass was extracted with additional aqueous hydrochloric acid and then with water. The mass consisted of a mixture of difluorotetrachloroethane and fluoropentachloroethane.

Example VII

In a copper cylindrical vessel provided with a water-cooled reflux condenser, also constructed of copper, and with inlets for hydrogen fluoride, chlorine and perchloroethylene, three hundred (300) parts of antimony pentachloride were heated to 75° C. and 20 parts of hydrogen were added during a period of four hours.

The temperature of the mass was raised to 90° C., which temperature was maintained throughout the subsequent addition of perchloroethylene, chlorine and additional hydrogen fluoride. These reactants were added at the respective rates of 10 parts, 4.5 parts and 2.5 parts per hour. This operation was continued for three hours. Subsequently, the reflux condenser was removed and the completed reaction mass heated as in Example V. The product, after treatment similar to that applied in Example V, was found to consist primarily of a mixture of difluorotetrachloroethane and trifluorotrichloroethane.

Example VIII

Five hundred (500) parts of antimony tribromide were placed in an apparatus designed to withstand pressure. The mass was heated to 105° C. and this temperature maintained during the remainder of the operation. There were added gradually 80 parts of bromine. Subsequently, there were added, gradually and simultaneously, 40 parts of bromine, 20 parts of hydrogen fluoride and 100 parts of bromoform. The operation was carried out under a pressure of 15 pounds per square inch.

The vapors were scrubbed through warm sodium hydroxide solution and were liquefied by means of two condensers, the first one of which was water-cooled, the second one brine-cooled. The water was removed from the first condensate, after which the two condensates were subjected to distillation in a suitable manner. Difluorobromomethane (B. P. about −15° C.) was obtained in quantity.

Example IX

A mixture of 300 parts of antimony pentachloride and 25 parts of antimony trichloride was heated to 70° C. and 20 parts of gaseous hydrogen fluoride added. The equipment was provided with a water-cooled condenser. Subsequently, 50 parts of tetrachlorobutane and 20 parts of hydrogen fluoride were gradually added, and the mixture heated until active refluxing occurred. The heating was continued for two hours after the addition of the materials.

The reflux condenser was replaced by a water-cooled condenser, by means of which the vapors could be condensed. Approximately 75 parts of distillate were collected. The antimony halides were removed by repeated washing with dilute hydrochloric acid and with water. As a final product, there were obtained about 25 parts of a liquid which boiled at about 180° C. It contained fluorine and chlorine; its composition corresponded approximately to that of difluorohexachlorobutane.

Example X

The procedure of Example IX was applied to 75 parts of allyl iodide instead of to tetrachlorobutane. Iodine was given off copiously during the addition of the allyl iodide, which was done gradually. The final product was a liquid which was heavier than water and which boiled at about 185° C. It contained fluorine and chlorine; its composition corresponded approximately to that of difluoropentachloropropane.

Example XI

The procedure of Example IX was applied to hexachlorohexylene ($C_6H_6Cl_6$). The hexachlorohexylene had been previously prepared by the chlorination of divinylacetylene.

The final product was a liquid, heavier than water, and whose boiling point was approximately 165° C. The product contained fluorine and chlorine; its composition corresponded approximately to that of tetrafluoropentachlorohexylene.

Example XII

Liquid hydrogen fluoride was introduced into a mixture of about 830 parts of antimony pentachloride and 250 parts of antimony trichloride at the rate of about 8 parts per hour under such conditions that the pressure in the reactor was about 75 pounds per square inch and the temperature about 100° C. The evolved hydrogen chloride was vented into a suitable scrubber. The hydrogen fluoride was continuously introduced at the rate of 8 parts per hour until 140 parts had been added. Additional hydrogen fluoride was introduced at the rate of 4 parts per hour until a total of 160 parts of the material had been added.

The temperature of the catalyst was then raised to 160° C. to 170° C. Hydrogen fluoride and perchloroethylene were then introduced into the catalyst at the following hourly rates:

| | Parts |
|---|---|
| Hydrogen fluoride | 3.0 |
| Chlorine | 2.5 |
| Perchloroethylene | 5.9 |

The reaction gases were removed from the reaction zone and washed successively with hot perchloroethylene, relatively cool perchloroethylene, water, aqueous sodium hydroxide and sulphuric acid.

In the early stages of operation the fluorinated product produced was largely trifluorotrichloroethane, most of which was removed from the evolved reaction gases by washing with the perchloroethylene and returned to the catalyst. The composition of the scrubber liquids gradually consisted more and more of trifluorotrichloroethane. The amount of these liquids recirculated into the catalyst was gradually increased up to about 40 to 50 parts per hour. Such addition was conveniently made through suitable weigh tanks, preferably agitated. The production of tetrafluorodichloroethane simultaneously increased until it finally reached about 4 parts per hour. The resultant fluorinated product, comprising substantially tetrafluorodichloroethane and trifluorotrichloroethane, was condensed and recovered. Approximately 33 parts of trifluorotrichloroethane were produced with every 100 parts of tetrafluorodichloroethane.

As the production of tetrafluorodichloroethane increased, all of the perchloroethylene introduced was used to scrub the reaction gases. The addition of chlorine to the reactor at the rate of 2.5 parts per hour was also continued until sufficient chlorine had been added to theoretically convert all of the perchloroethylene initially added to the scrubber to hexachloroethane. Thereafter, chlorine was added to the reactor at the rate of 0.43 part for each part of perchloroethylene. After the process had been operated for sufficient time to accumulate a supply of trifluorotrichloroethane by fractionation of the product, this material was returned to the reaction zone by introducing it into the perchloroethylene washers.

After continuous operation had been established, the hourly introduction of raw materials into the system was:

|                           | Parts |
|---------------------------|-------|
| Chlorine                  | 2.0   |
| Perchloroethylene         | 4.75  |
| Trifluorotrichloroethane  | 1.25  |
| Hydrogen fluoride         | 2.5   |

The pressure in the reaction zone was about 70 to about 125 pounds per square inch.

Example XIII

Five (5) parts of the catalyst which was prepared by the procedure described in Example XII was removed from the reactor and heated to about 140° C. to about 150° C. in a small steel autoclave bomb with one part of hexachloroethane for five hours. Upon cooling and opening the bomb and distilling the product, a 75% yield of a mixture of tetrafluorodichloroethane and trifluorotrichloroethane was obtained.

Example XIV

The process of Example XII was carried out except that hexachloroethane was substituted for perchloroethylene as the starting material. Previously prepared trifluorotrichloroethane was used to wash the reaction gases instead of perchloroethylene. The hexachloroethane was dissolved in heated trifluorotrichloroethane under pressure, and the liquid mixture was then fed to a weigh tank and, subsequently, to the reactor. The recovered fluorinated product was a mixture comprising substantially tetrafluorodichloroethane and trifluorotrichloroethane.

Example XV

Instead of a single reactor, two chrome steel reactors were connected in series and into each were charged 250 parts of antimony trichloride and 250 parts of antimony pentachloride. The temperatures of both reactors were raised to 90° C. to 100° C., which temperature range was maintained during the following preparation of the catalyst. Liquid hydrogen fluoride was fed into the first reactor at the rate of about 8 parts per hour under a super-atmospheric pressure of about 75 pounds per square inch. The effluent gases from the first reactor were vented into the second reactor. As the fluorination of the catalyst progressed, the amount of hydrogen fluoride utilized by the first catalyst decreased until finally practically all of it was passed into the second catalyst. When a total of 180 parts of hydrogen fluoride had been introduced, the introduction of hydrogen fluoride was stopped. At this point, the first catalyst contained approximately 20% fluorine and the second catalyst about 13% fluorine.

The temperature of the first catalyst was then raised to about 150° C. to about 160° C. and that of the second catalyst to about 145° C. to about 155° C. While maintaining a pressure of 75 to 80 pounds per square inch, hydrogen fluoride and trifluorotrichloroethane were added to the first catalyst and hexachloroethane dissolved in trifluorotrichloroethane at 170° C. to 180° C. under pressure was fed to the second catalyst at the following hourly rates:

| Hydrogen fluoride | 2.5 parts |
| Hexachloroethane | 6.75 parts dissolved in 1 part trifluorotrichloroethane |
| Trifluorotrichloroethane | 40 to 50 parts |

The fluorinated product, comprising substantially tetrafluorodichloroethane and trifluorotrichloroethane, was condensed in the manner described in Example I.

Example XVI

Approximately 350 parts of antimony trichloride and 650 parts of antimony pentachloride were introduced into a chrome steel reactor and subsequently about 105 parts of hydrogen fluoride (98% HF) were added at approximately the rate of 5 parts per hour. A temperature of about 100° C. and a pressure of about 100 to 110 pounds per square inch were maintained. Subsequently, the temperature of the catalyst was maintained at about 170° C. to about 175° C. under a pressure of about 100 to about 110 pounds per square inch (gauge), and the following hourly feeds of the reactants were maintained:

|                    | Parts |
|--------------------|-------|
| Hydrogen fluoride  | 3.0   |
| Chlorine           | 5.4   |
| Trichloroethylene  | 4.8   |

The fluorinated product was recovered after washing and scrubbing, as previously described. It was a mixture of highly fluorinated chloroethanes, including tetrafluorodichloroethane and trifluorotrichloroethane. Fractional distillation resulted primarily in the recovery of two fractions that boiled, respectively, at about 5° C. and at about 47° C.

Example XVII

Hydrogen fluoride was passed into a mixture of 4.5 parts of antimony pentachloride and 0.5 part of antimony trichloride at a temperature of about 100° C. under a pressure of about 75 pounds per square inch (gauge) until the product contained about 20% fluorine, and the resultant product was then heated under autogenous pressure with the addition of 1 part of perchloroethylene at a temperature of about 140° C. to about 150° C. for five hours. The autoclave was cooled and opened, and the product distilled, whereby a 75% yield of a mixture of trifluorotrichloroethane (B. P. 47.7° C.) and tetrafluorodichloroethane (B. P. 3.6° C.) was obtained.

Example XVIII

The procedure described in Example XVII was repeated except that trichloroethylene was used instead of perchloroethylene. The product was similar to that of Example XVII.

Example XIX

The procedure described in Example XVII was repeated except that $C_2F_3Cl_3$ was used as the raw material instead of perchloroethylene, and the reaction temperature was 150° C. to 160° C. instead of 140° C. to 150° C. The yield of $C_2F_4Cl_2$ (B. P. 3.6° C.) was about 80%.

Example XX

Hydrogen fluoride reacted with $C_2H_2Cl_4$ at about 125° C. under about 10 pounds per square inch (gauge) pressure in the presence of a mixed antimony penta- and tri-valent chloride catalyst (containing about 48% trivalent Sb) yielded hydrogen-containing fluorinated compounds. Examples of these compounds are $C_2H_2F_2Cl_2$, $C_2H_2F_3Cl$ and $C_2HF_3Cl_2$.

Example XXI

A catalyst was prepared by gradually adding 150 parts of hydrogen fluoride to a mixture of 650 parts of antimony pentachloride and 350 parts of antimony trichloride at a temperature of 100 to 110° C. under a pressure of 75 pounds per square inch (gauge) in a suitable reactor. Subsequently, the catalyst was maintained at a temperature of about 150° C. to about 175° C. and the pressure of the system at about 100 to 110 pounds per square inch (gauge). A mixture containing 80% tetrachloroethane, 15% pentachloroethane and smaller proportions of hexachloroethane and perchloroethylene was added to the catalyst at a rate of 6 parts per hour. Hydrogen fluoride was added at the rate of 3 parts per hour. Chlorine was added at such a rate that the effluent vapors contained appreciable proportions of free chlorine. The reaction gases were passed successively through a water scrubber maintained at a temperature of about 55° C., a caustic alkali scrubber at a temperature of about 55° C., and a sulphuric acid scrubber at a temperature of about 55° C. The dry, neutral fluorinated product was liquefied and recovered.

A halogenated hydrocarbon raw material similar to that used in Example XXI may be conveniently the reaction product of the combination of chlorine and acetylene in the presence of a catalyst, e. g., ferric chloride or antimony pentachloride.

Example XXII

To a suitable reactor were added 1000 parts of antimony pentachloride. The temperature was raised to 75° C. to 85° C. Hydrogen fluoride was added at atmospheric pressure to the mixture until the fluorine content of the latter was approximately 17%. This operation required eight hours.

The temperature of the fluorinated antimony halide was raised to 165° C. during four hours and then held between 160° C. and 170° C. for twelve hours. During the heating period and during the subsequent five hours, there were gradually added 200 parts of a heated mixture containing hexachloroethane and trifluorotrichloroethane in the ratio of 3 to 1. The pressure was allowed to rise to 100 pounds per square inch and was subsequently held between 90 and 100 pounds per square inch during this phase of the operation. The vented vapors were passed through a heated reflux column (50° C. to 80° C.) and then through a suitable purifying system, and condensed in the usual manner.

The temperature was gradually decreased to 115° C. during a two-hour period. The pressure was then decreased to 50 pounds per square inch by venting in the usual manner.

Hydrogen fluoride was again added until the fluorine content was about 17%. In addition, 15 parts of chlorine were added. The gases were passed to the usual purifying train. During the hydrogen fluoride addition the temperature was maintained within the range of about 105° C. to about 115° C., and the pressure between 50 and 60 pounds per square inch.

The temperature was again raised and maintained, and the hexachloroethane-trifluorotrichloroethane mixture added in the manner described above.

Subsequently, the above cycle was repeated for an undetermined number of times.

There was obtained from each cycle approximately 125 parts of fluorinated product. The latter contained approximately 60% tetrafluorodichloroethane, 35 parts of trifluorotrichloroethane and smaller amounts of difluorotetrachloroethane.

Example XXIII

In an apparatus similar in principle to that of Fig. 3, gaseous hydrogen fluoride was passed through liquid carbon tetrachloride heated to about 70° C. The mixture of vapors was then passed through a column of granular charcoal maintained at a temperature of about 400° C. At a rate of flow of about 30 parts of hydrogen fluoride per hour, a utilization of about 86% of the hydrogen fluoride was obtained.

The exit gases from the catalyst were washed with water, caustic and sulphuric acid. During the operation the caustic and sulphuric acid scrubbers and the intermediate trap were held at a temperature of about 50° C. to 60° C. The product, condensed at a temperature of about —40° C. to —50° C. by means of a suitable refrigerant and recovered in liquid form, was then fractionally distilled to yield about 30% difluorodichloromethane, 60% fluorotrichloromethane and 10% carbon tetrachloride.

Example XXIV

Hydrogen fluoride gas was passed through boiling chloroform and the mixture of vapors then passed up through a column of charcoal about twenty inches high and three-fourths of an inch in diameter. The temperature of the charcoal was gradually raised from 50° C. to 300° C. The reaction started at about 200° C. and progressed smoothly at about 300° C. At a rate of feed of about 26 parts of hydrogen fluoride per hour, approximately 85% of the hydrogen fluoride reacted.

The gaseous products obtained after passage through the catalyst were washed with an aqueous sodium hydroxide solution and sulphuric acid (about 90% to 95%). They were then condensed at a temperature of about —20° C. to —30° C. The condensate was fractionally distilled and was found to consist of approximately 10% difluorodichloromethane, 60% fluorodichloromethane and 30% chloroform.

Example XXV

Hydrogen fluoride vapor was passed through trifluorotrichloroethane heated to a temperature of about 20° C to 25° C., and the mixture of vapors then passed through a column of small pieces of carbon maintained at a temperature of about 500° C. to 600° C. The reaction product was washed free from acid, dried, condensed and subsequently fractionally distilled. Under the conditions of reaction, approximately 50% of the hydrogen fluoride was utilized with a passage of about 40 parts of hydrogen fluoride per hour. The products isolated by fractional distillation were pentafluorochloroethane ($C_2F_5Cl$) and tetrafluorodichloroethane ($C_2F_4Cl_2$). The pentafluorochloroethane, which is apparently a new product, never before isolated, boils at about —40° C. at atmospheric pressure.

Example XXVI

Twenty (20) parts of hydrogen fluoride and 150 parts of dichloroethane were hourly vaporized and passed through about 260 parts of activated carbon maintained at a temperature of about 300° C. to 400° C., the apparatus employed being similar in principle to that described in Fig. 2. The partial condenser was maintained at a temperature of about 20° C. The gases were purified, dried and condensed in an analogous manner to that described in the other examples. Fluorinated products were obtained. The products obtained by fractional distillation were indicated to be fluorochloroethane, difluoroethane, vinyl fluoride and vinyl chloride. The amounts of the vinyl compounds produced were increased by operation at higher temperatures.

Example XXVII

Gaseous hydrogen fluoride and carbon tetrachloride in proportions corresponding to about 20 parts of hydrogen fluoride and 300 parts of carbon tetrachloride were hourly passed through 300 parts of a mixture of 90% charcoal and 10% cuprous chloride disposed in a chromium alloy steel tube having a length approximately ten times its diameter. The catalyst was maintained at a temperature of 250° C. by means of external electrical heating coils.

The gases, after passage through the catalyst, consisted chiefly of hydrogen chloride, difluorodichloromethane, fluorotrichloromethane, hydrogen fluoride and carbon tetrachloride. The hydrogen chloride and hydrogen fluoride were largely removed by treatment with water. The gas stream was further purified by scrubbing through an aqueous 9% to 10% caustic solution and then through a 90% to 95% sulphuric acid solution. During the operation, the caustic and sulphuric acid scrubbers and the intermediate trap were held at a temperature of about 50° C. to 60° C. The product, condensed at a temperature of about —40° C. to —50° C. and recovered in liquid form, was then fractionally distilled to separate difluorodichloromethane, fluorotrichloromethane and carbon tetrachloride. The overall yield of fluorinated derivatives, based on hydrogen fluoride, was about 82%.

Example XXVIII

The vapors of 20 parts of substantially anhydrous hydrogen fluoride and 310 parts of carbon tetrachloride were hourly passed through 300 parts of a catalyst composed of charcoal and ferric chloride in an iron reactor similar in design to that described in Example XXVII. The temperature of the catalyst was maintained at about 145° C. to 155° C. This catalyst was prepared by mixing 1 part of sublimed ferric chloride with 10 parts of charcoal.

The mixture of gases leaving the catalyst consisted of hydrogen chloride, difluorodichloromethane, fluorodichloromethane and unreacted hydrogen fluoride and carbon tetrachloride. The gas mixture was passed through water which removed the greater part of the hydrogen halides. The gases were then further purified by washing with caustic soda solution and then drying with sulphuric acid (specific gravity 1.80). During five hours of continuous operation a yield of 88% of fluorine derivatives, based upon hydrogen fluoride, was obtained.

Example XXIX

There were hourly added 120 parts of difluorodichloromethane and 20 parts of hydrogen fluoride to 300 parts of a catalyst consisting of 90% activated carbon and 10% cuprous chloride and maintained within the temperature range 350° C. to 450° C.

The exit gases consisted of a mixture of trifluorochloromethane, difluorodichloromethane, hydrogen chloride and hydrogen fluoride. The fluorochloro derivatives were purified by passing successively through water, aqueous sodium hydroxide solution and sulphuric acid (specific gravity 1.80), all of which were held at 20° C. to 30° C. The purified gases were, with the exception of a small amount of trifluorochloromethane, liquefied by means of a condenser, maintained at about —75° C.

The uncondensed fluorinated material was collected in a gasometer. The liquid was subjected to suitable fractional distillation, whereupon it yielded trifluorochloromethane (B. P. about —80° C.) and difluorodichloromethane.

Example XXX

Substantially anhydrous hydrogen fluoride was allowed to vaporize and the vapors passed through trifluorotrichloroethane heated to a temperature of about 42° C. The mixture of vapors was then passed through a column of pieces of porous fused alumina, impregnated with vanadium tetrachloride. The catalyst was contained in a tube constructed of a molybdenum-containing steel, and was maintained at a temperature of about 500° C. Hydrogen chloride, tetrafluorodichloroethane and pentafluorochloroethane were produced.

The gas mixture was scrubbed with water and an aqueous alkali metal hydroxide solution and dried with sulphuric acid. On condensing the product in an alcohol-carbon dioxide ice bath, a liquid which boiled at about 0° C. was obtained. This liquid was a mixture of pentafluorochloroethane, tetrafluorodichloroethane and unconverted trifluorotrichloroethane. Under the conditions of reaction approximately 50% of the hydrogen fluoride was utilized. The liquid mixture above described was subjected to fractional distillation and the pentafluorochloroethane ($C_2F_5Cl$) and tetrafluorodichloroethane ($C_2F_4Cl_2$) were isolated.

Example XXXI

Hydrogen fluoride was allowed to boil gently and the vapors passed through fluorotrichloromethane held at a temperature of about 20° C. to 25° C. The gaseous mixture of the two compounds was then passed through 400 parts of a heated column of porous fused alumina fragments impregnated with manganese chloride. The temperature was maintained at about 400° C. The rate of feed of hydrogen chloride averaged about 20 parts per hour. The gases leaving the catalyst were washed consecutively with water, caustic and sulphuric acid. The remaining gases, when condensed at a temperature of about —50° C., produced a colorless liquid which began to boil at about —25° C. This product was a mixture consisting largely of difluorodichloromethane and fluorotrichloromethane. These two components were obtained in a pure state by fractional distillation of the above described mixture, the distillation preferably being carried out under super-atmospheric pressure.

Example XXXII

One hundred (100) parts of gaseous hydrogen fluoride were passed into 200 parts of freshly distilled benzotrichloride maintained at a temperature of about 110° C. The vapors evolved were passed into water, and the formed oily product separated and returned to the reaction mass. The reaction mass was then steam-distilled, benzofluorodichloride (B. P. 178° C. to 180° C.) and benzodifluorochloride being removed.

Example XXXIII

Toluene was chlorinated with phosphorus pentachloride at 190° C. to 200° C. and the resultant product distilled to produce benzotrichloride. About 195 parts of this product were treated with about 75 parts of hydrogen fluoride over a period of about two and one-half hours at a temperature of around 175° C. The reaction gases were passed through a reflux condenser maintained at a temperature of about 150° C. and the products recovered as described in Example XXXII. Products boiling at about 178° C. to 180° C. corresponding to benzofluorodichloride, 142° C. to 143° C. corresponding to benzodifluorochloride and 102° C. to 105° C. corresponding to benzotrifluoride were recovered.

Example XXXIV

Gaseous hydrogen fluoride (about 180 parts) was passed into a mixture of approximately 270 parts of benzotrichloride mixed with about 25 parts of phosphorus pentachloride at about 20° C. to 25° C. Benzofluorodichloride, benzochlorodifluoride and benzotrifluoride were produced.

Example XXXV

Benzotrichloride in proportions of about 682 parts was mixed with about 4 parts of an antimony fluorochloride prepared by passing gaseous hydrogen fluoride into antimony pentachloride until a compound melting at about 40° C. was formed. Anhydrous hydrogen fluoride was then passed into this mixture at the rate of about 120 parts per hour. During the addition, about 4 parts of phosphorus pentachloride were added. The gaseous products were absorbed in water and the oily layer returned to the reaction mass as in Example XXXII. The resultant product was mixed with a 10% to 15% caustic soda solution and then steam-distilled. The distillate was fractionally distilled, yielding benzotrifluoride and benzofluorochlorides.

Example XXXVI

About 680 parts of ortho-chlorobenzotrichloride were mixed with 20 parts of phosphorus pentachloride and 20 parts of an antimony fluorochloride, prepared as in Example XXXV. About 240 parts of hydrogen fluoride were then passed in at room temperature. The product was recovered as in Example XXXV. A compound having a boiling range of 151° C. to 152.5° C. was obtained. It was ortho-chlorobenzotrifluoride.

Example XXXVII

Gaseous hydrogen fluoride and chlorine were passed into benzotrichloride containing a small amount of phosphorus pentachloride and antimony fluorochloride. The product was recovered as in Example XXXV. A material distilling between 112° C. and 143° C. was obtained from which was recovered a white liquid denser than water and of a mild odor, having a boiling point of about 138° C. This was most probably meta-chlorobenzotrifluoride.

Example XXXVIII

To 140 parts of carbon tetrachloride there were added 35 parts of an antimony fluoride catalyst that had been prepared by passing hydrogen fluoride gas into antimony pentachloride until a semi-solid mass had been formed. Gaseous hydrogen fluoride was passed into the treated carbon tetrachloride. A reaction took place with the evolution of gases which were passed through a 15% sodium hydroxide solution in water. Additional carbon tetrachloride was added in portions until the catalyst concentration was decreased to about 6%. The reaction caused a cooling of the reaction mixture.

The evolution of gases proceeded throughout the experiment. The gases were liquefied by passing into a condenser that was cooled with a mixture of ice and salt. The condensate was fractionally distilled. Most of the distillate boiled in the range 23.8° C. to 24.5° C. The product was fluorotrichloromethane ($CFCl_3$).

Example XXXIX

To 358 parts of chloroform there were added 30 parts of antimony fluorochloride catalyst that had been prepared in a like manner to that used in Example XXXVIII. Gaseous hydrogen fluoride was passed into the mixture. A low-boiling product, gaseous at ordinary temperatures, was produced. This gas was insoluble in an aqueous sodium hydroxide solution. An additional 117 parts of chloroform were subsequently added. The evolution of the gaseous product continued.

The gaseous product was liquefied by means of a condenser cooled with an ice-salt mixture. The condensate was fractionally distilled. Most of the product boiled in the range 8.8° C. to 10° C. The product was fluorodichloromethane ($CHFCl_2$).

Example XL

A mixture of 95% chloroform, 2% antimony pentachloride and 3% chlorine were passed into a column of charcoal. At the same time, hydrogen fluoride was introduced at a rate equivalent to that of the chloroform. The charcoal was heated to 120° C. to 135° C. The rate of introduction of chloroform was 120 to 140 parts per hour. The duration of the operation was five hours.

The conversion of hydrogen fluoride to hydrogen chloride was 74% to 85%. The vapors were scrubbed through water at room temperature. Very little $CHCl_3$ condensed in this scrubber. The scrubbed vapors were condensed. The resulting liquid contained mostly fluorodichloromethane; small amounts of difluorochloromethane were present.

Example XLI

A column of decolorizing charcoal was treated with 5 parts of antimony pentachloride in 100 parts of carbon tetrachloride and then hydrogen fluoride gas and carbon tetrachloride vapor were introduced into the resultant antimony pentachloride-on-carbon catalyst. At a temperature of 150° C. fluorotrichloromethane and difluorodichloromethane were produced. The heating was continued to 300° C. with a good production of fluorotrichloromethane and difluorodichloromethane.

Example XLII

Hydrogen fluoride was added to a mixture of 2550 parts of antimony pentachloride and 250 parts of antimony trichloride until the fluorine content of the mixture was within the range of 6% to 10%. The mixture was heated to 60° C. to 65° C., which temperature was maintained throughout the remainder of the operation. Subsequently, carbon tetrachloride and additional hydrogen fluoride were fed at the respective rates of about 160 parts and 40 parts per hour, unless the fluorine content of the antimony halide mixture was outside the above range. Whenever the fluorine content came outside the desired range, the feed of hydrogen fluoride was increased or decreased until the proper adjustment of the antimony halide catalyst had taken place, after which the normal rates of feed were maintained.

The product consisted primarily of a mixture of about 80% difluorodichloromethane and 20% fluorotrichloromethane. The boiling point of the product was usually below —20° C.

A slightly less uniform product was obtained by maintaining the fluorine content in the less restricted range of 4% to 13%. This roughly corresponds to the use of a catalyst in which the value of $x$ in a pentavalent complex of the type $SbF_xCl_{5-x}$ lies between about 0.5 and 2.0. The more restricted range, 6% to 10% fluorine, roughly corresponds to a value of 0.9 to 1.5 for $x$.

Example XLIII

Approximately 600 parts of antimony pentachloride were added to a cast iron reaction vessel having a height of more than twice its diameter. The vessel was maintained at a temperature of about 60° C., and over a period of about twenty-five hours 500 parts of substantially dry hydrogen fluoride and 1925 parts of carbon tetrachloride were introduced into the reaction vessel. Both of these substances were introduced beneath the surface of the antimony pentachloride and below a perforated plate. After the reaction had started, the carbon tetrachloride, before being introduced into the reaction zone, was used to scrub the reaction gases. During the reaction the catalyst-containing reaction mixture was continuously pumped from the lower part of the reaction zone to the vapor space above the reaction mixture by an external circulation system. The circulated material may be passed through a heat exchanger, preferably maintained at about 110° C.

The vaporized products, comprising substantially hydrochloric acid, fluorotrichloromethane and difluorodichloromethane together with small quantities of unconsumed hydrogen fluoride, carbon tetrachloride and volatilized antimony halide, were passed through a warm and a cold carbon tetrachloride scrubber in the order named, the second scrubber refluxing back to the first.

The resultant gases were then further purified by passing them through water, an aqueous alkaline hydroxide solution and concentrated sulphuric acid, and then subjecting them to condensation. Difluorodichloromethane in excellent yield was obtained.

Example XLIV

Hydrogen fluoride gas (10 parts) was slowly added to acetyl chloride (80 parts) contained in a cylindrical copper vessel which was provided with a condenser cooled with a mixture of alcohol and ice. Temperatures between 15° C. and 25° C. were maintained in the reaction vessel.

Hydrogen chloride was copiously evolved. Upon redistillation of the condensed liquid, acetyl fluoride (B. P. about 10.5° C.) was obtained.

Example XLV

To 140 parts of benzoyl chloride in a cylindrical copper vessel there were gradually added 20 parts of hydrogen fluoride gas. The temperature was maintained between 20° C. and 30° C.

Hydrogen chloride in quantity was evolved. The distillation of the liquid reaction mass resulted in the isolation of benzoyl fluoride (B. P. about 155° C.).

Example XLVI

Methylene chloride and hydrogen fluoride were added to an antimony fluorochloride catalyst maintained at a temperature of 70° C. and under a pressure of 25 (gauge) pounds per square inch. There was obtained a mixture of fluorinated derivatives and unconsumed methylene chloride. From the fluorinated product there were isolated a substance boiling at approximately —10° C. and a substance boiling at approximately —50° C. These two substances were, respectively, fluorochloromethane ($CH_2FCl$) and difluoromethane ($CH_2F_2$).

Methylene chloride and hydrogen fluoride may be added to the antimony halide catalyst simultaneously or consecutively. For instance, the hydrogen fluoride may be added first, followed by the methylene chloride. The antimony halide may consist initially of antimony pentachloride.

Example XLVII

A mixture of 75 parts of antimony pentachloride, 10 parts of antimony trichloride and 10 parts of chloroform was placed in the reactor of a set-up similar in principle to that illustrated by Fig. 2.

While the above mixture was maintained at about 75° C. there were added substantially anhydrous hydrogen fluoride and chloroform for the desired period of operation. The hydrogen fluoride gas was added at the rate of about 10 parts per hour and the chloroform at the rate of about 70 parts per hour.

During the operation, the temperature of the chloroform in washer K was held at about 25° C. The caustic and the sulphuric acid scrubbers and the intermediate trap were held at a temperature of 50° C. to 60° C.

The condenser and the receivers were held at approximately —60° C. by means of a suitable refrigerant.

The condensate was subjected to fractional distillation for the purpose of separating difluorochloromethane and fluorodichloromethane. The former boils at about —15° C. under a total pressure of 1520 mm. mercury; the latter boils at about +8.7° C. under atmospheric pressure. This fractional distillation also permits separation of any chloroform carried through the apparatus. Any chloroform which may be recovered may be used again in the operation.

The yield of fluorodichloromethane is about 80% to 90% and that of difluorochloromethane is about 10–5%, both yields being based upon consumed chloroform.

While the process above disclosed is described as being continuous, it is to be understood that the apparatuses illustrated in Figs. 1 and 2 might be operated to carry out a batch process.

In such a batch process the hydrogen fluoride and acyclic halogen compound would be added consecutively instead of simultaneously, as will be clear from the following example:

Example XLVIII

The reactor H (Fig. 2) was filled with 2000 parts of a mixture of 90% antimony pentachloride and 10% antimony trichloride. The mixture was heated to 100° C. One hundred (100) parts of hydrogen fluoride gas were then passed into the reactor. After the addition of the hydrogen fluoride, the supply valve was closed and 385 parts of carbon tetrachloride were passed into the reactor. During the addition of the carbon tetrachloride, the temperature of the antimony compounds was maintained at about 60° C. and the carbon tetrachloride in washer K at about 0° C. A yield of about 80% to 90% of the theoretical amount of mixed difluorodichloromethane and fluorotrichloromethane was obtained.

As indicated above, the process is not limited to the fluorination of the materials mentioned specifically in the examples and description such as, for example, carbon tetrachloride and chloroform. In general, acyclic halogen compounds may be subjected to fluorination in an analogous manner. Among the compounds from which fluorine-containing compounds have been obtained, there may be mentioned the following: methylene chloride ($CH_2Cl_2$), fluorotrichloromethane ($CFCl_3$), ethyl chloride ($CH_3-CH_2Cl$), isopropyl bromide ($CH_3-CHBr-CH_3$), ethylene dibromide ($CH_2Br-CH_2Br$), tribromoethane ($C_2H_3Br_3$), tetrabromoethane ($C_2H_2Br_4$), hexabromoethane ($C_2Br_6$), tetrachloroethane ($CHCl_2-CHCl_2$), trichloroethylene ($CHCl=CCl_2$), pentachloroethane ($C_2HCl_5$), hexachloroethane ($C_2Cl_6$), dichloroethane, ($C_2H_4Cl_2$), dichloroethylene ($C_2H_2Cl_2$), perchloroethylene ($C_2Cl_4$), tetrachlorobutane ($C_4H_6Cl_4$), allyl bromide ($C_3H_5Br$), allyl iodide ($C_3H_5I$), hexachlorohexylene ($C_6H_6Cl_6$), bromoform ($CHBr_3$) carbon tetrabromide ($CBr_4$), and halogen derivatives of higher members of the aliphatic series.

By the phrase "acyclic compounds" it is intended to cover carbon compounds having an open chain, for example, paraffins, olefines and the like. As further examples of compounds which may be fluorinated in accordance with the present invention may be mentioned compounds containing at least one acyclic carbon atom having attached thereto an aryl radical and a halogen other than fluorine as, for example, benzotrichloride ($C_6H_5CCl_3$), ortho-chlorobenzotrichloride ($ClC_6H_4CCl_3$), ortho-bromobenzotrichloride ($BrC_6H_4CCl_3$), benzotribromide ($C_6H_5CBr_3$), benzofluorochloride ($C_6H_5CHFCl$), benzofluorodichloride ($C_6H_5CFCl_2$), benzodifluorochloride ($C_6H_5CF_2Cl$), xylenes and derivatives thereof having the side chain methyl groups halogenated with a halogen other than fluorine, e. g., di-(trichloromethyl)-benzenes, chloro-di-(trichloromethyl)-benzenes, and other substituted di(trichloromethyl)-benzenes.

In fluorinating alphyl compounds it has been noted that the chlorine atoms in the acyclic portion may be replaced by fluorine without affecting chlorine atoms in the aryl portion. It will be understood that the operating conditions may vary widely depending largely upon the nature of the compound subjected to fluorination and the results desired. While halogen atoms other than fluorine (including chlorine, bromine and iodine) attached to acyclic carbon atoms may be replaced by fluorine in accordance with this invention, the process has thus far been particularly advantageous in the fluorination of chlorine-containing acyclic hydrocarbon derivatives. The replacement of chlorine by fluorine is more difficult than that of either bromine or iodine. The term "halogenated hydrocarbon" is used in the specification and claims to mean hydrocarbons in which one or more or even all of the hydrogen atoms have been substituted or replaced by halogen atoms.

By the term "hydrogen fluoride" unless otherwise indicated it is intended to include and to cover not only the pure product but, also, hydrogen fluoride or hydrofluoric acid which may contain small amounts of impurities as, for example, water.

As will be clear from the above description, partially fluorinated acyclic compounds containing other halogen atoms than fluorine may be further fluorinated by this process.

Where the original organic halogen derivative contains hydrogen, a substitution of halogen for hydrogen may take place during the fluorination operation. This is particularly true if a free halogen such as chlorine is present in the reaction mass. Examples of such reactions are those taking place when allyl iodide (see Example X), tetrachlorobutane or tetrachloroethane are fluorinated.

Other groups in certain of the halogenated acyclic derivatives may or may not be changed by the fluorination processes of the present invention. An example of a group that would undergo change is the hydroxyl group which is present in a halogenated alcohol. The fluorination of chloro propyl alcohols in the presence of the antimony pentahalide catalysts and chlorine would result in the formation of fluorochloro derivatives no longer containing the hydroxy group. As an example of a group in which no change of the side group occurred during such a fluorination, there may be mentioned the

group, which would not be changed, for instance, during the fluorination of tribromo-acetyl fluoride to a fluorobromo-acetyl fluoride.

In general, where the original acyclic halogen compound is unsaturated, the addition of halogen and the introduction of fluorine may take place in the same operation. For example, from trichloroethylene, a product containing fluorine derivatives of ethane is obtainable. This reaction is especially likely to take place if a free halogen such as chlorine is present. Similarly fluorochloro derivatives of ethane may be prepared by passing tetrachloroethylene, hydrogen fluoride and chlorine through the catalyst under suitable conditions of temperature and pressure.

Numerous catalysts have been set forth in the examples, most of which are metal halides. The metal halide employed as the catalyst is preferably a halide of a heavy metal. It will be understood that by "heavy metal" is meant a metal having a specific gravity greater than 4. In general, very highly desirable results have been obtained in the use of metal chlorides as catalysts for the fluorination. Other halides as, for example, bromides or iodides will function satisfactorily. The catalyst may originally be used in the form of a fluoride as, for example, silver fluoride. If desired, the catalyst may be a mixture of various metal halides. Also, the metal may be originally added in the form of some other compound, such as the acetate or oxide, which is convertible to a halide by a hydro-halide. It will be recognized that the original metal halide may be partially or completely changed to one or more other halides. For instance, if ferric bromide is used in the fluorination of carbon tetrachloride, it is likely that the resulting halide will be a mixture or combination of ferric chloride and ferric fluoride. In the case of certain metallic halides, such as those of gold, platinum and the other noble metals, the halide may be reduced to the metal and the catalytic efficiency may continue. Thus, we have found that metallic platinum supported upon an inert support or upon activated carbon functions as a fluorinating catalyst.

The metal halide may be fixed on a support. The support may be a pervious body of rigid character, i. e., which is not disintegrated under the condition of reaction. It may be relatively inert or catalytically active. In practicing the invention, very highly desirable results have been obtained in the use of catalysts composed of one or more metal halides supported on relatively inert material such as porous fused alumina. Especially advantageous results have been obtained by carrying out the fluorination reaction with catalysts consisting of one or more metal halides supported on a material which itself is catalytically active as, for example, carbon. It has been noted that, in general, a combination of a metal halide with carbon functions at a lower temperature than does either the halide or the carbon. This was shown by the fact that copper chloride upon porous fused alumina did not effectively fluorinate carbon tetrachloride below 400° C.; neither did a certain activated carbon. However, a combination of copper chloride and the same carbon gave excellent results at 250° C. It has been noted, also, that ferric chloride and carbon when used singly at 100° C. to 200° C. afforded only slight fluorinations of carbon tetrachloride. When used together, conversions of 70% to 90% of the hydrogen fluoride were obtained.

The carbon employed as a support for the metal halide may be of vegetable, animal or mineral origin. Charcoal prepared from various vegetable sources, bone char from bones, coke from petroleum, coal and the like, and, in general, material consisting essentially of carbon which has been prepared by the destructive distillation of organic material has been found to be satisfactory. The carbon, regardless of source and mode of preparation, should preferably have absorptive properties. Very desirable results have been obtained in the use of the so-called activated carbons such as may be prepared in various well known ways, for instance, by heating carbon to high temperatures in the presence of air, steam, a halogen or an inert gas. Acid-washed carbon has been used with satisfactory results.

The metal halide may be fixed on the support by various means. As illustrations of the methods which may be employed may be mentioned: (1) the support may be impregnated with the anhydrous metallic halide as, for example, vanadium chloride or zinc bromide; (2) the solid metallic halide may be mixed mechanically with the support; (3) the support may be impregnated with a solution of the metallic halide and the solvent evaporated; (4) the metallic halide may be distilled or sublimed on the support; and (5) the metallic halide may be formed in the presence of the support by chemical action, e. g., ferric chloride may be prepared in the presence of activated carbon by treatment of heated iron with chlorine. Methods (4) and (5) or combinations thereof may be carried out simultaneously with the addition of the reacting components. For example, antimony pentahalides may be added to charcoal simultaneously with the addition of hydrogen fluoride and chloroform. Various other procedures may be employed. In many cases, the metal halide may serve as a binding agent. For example, the catalyst may be prepared from finely ground carbon by mixing it with an aqueous solution of calcium chloride and subsequently removing the water.

As specific examples of catalysts which have given desirable results in the practice of the invention, the following may be mentioned: silver chloride on porous fused alumina; cupric chloride on porous fused alumina; ferric chloride on porous fused alumina; vanadium chloride on porous fused alumina; manganese chloride on porous fused alumina; a mixture of mercuric chloride, manganese chloride, sodium chloride and copper chloride on porous fused alumina; a mixture of manganese chloride and silver chloride on porous fused alumina; a mixture of zinc chloride and calcium chloride on porous fused alumina; a mixture of ferric chloride, copper chloride and mercuric chloride on porous fused alumina; ferric chloride impregnated upon steel wool; and activated carbon in combination with one or more of the following compounds; an antimony chloride, a copper chloride, platinic chloride, mercuric chloride, a vanadium chloride, a uranium chloride, silver chloride, nickel chloride, cobalt chloride, cadmium chloride, calcium chloride, zinc chloride and an iron chloride.

The above specific catalysts may be classified, in general, as halides of metals of groups I, II, V, VI, VII and VIII of the periodic system, this classification being as follows:

Group I copper, silver, sodium
Group II cadmium, calcium, zinc, mercury
Group V vanadium, antimony
Group VI uranium
Group VII manganese
Group VIII iron, nickel, cobalt, platinum The majority of the metals in this group have an atomic weight from about 51 to about 122, that is, from vanadium to antimony, inclusive.

Antimony halide catalysts have given especially desirable results, one of the advantages being the relatively low temperature of operation.

The antimony halide used is ordinarily in the pentavalent form but, in certain instances, it may be desirable to replace a portion of the pentavalent compound with the trivalent compound, as explained later. The pentavalent antimony compound may contain the theoretical proportion of halogen or halogens; it may contain an excess of halogen; or it may contain an antimony trihalide.

A free halogen such as chlorine may be present or may be added at any time in the process. It is desirable to have a free halogen present when the substances being treated are of such a nature that they reduce the pentavalent catalyst compound to the trivalent form.

An excess of the fluorinated antimony halide favors the introduction of more than one fluorine atom and an excess of the acyclic halogen compound favors the introduction of only one fluorine atom.

The degree of fluorination of the antimony halide may be varied over a wide range, the only requirement being that there be present a complex of the general composition $SbF_xCl_{5-x}$, in which $x$ is an integer less than 6. In general, $x$ may be any positive value less than 5 and, preferably, less than 3.

The general composition of the pentavalent fluorochloride present in the catalyst may be represented empirically as $SbF_xHal_{5-x}$, in which Hal represents a halogen atom other than fluorine, and $x$ and $5-x$ represent, respectively, the average fluorine and halogen compositions of the catalyst. As $x$ approaches 5, the substitution by fluorine of more than one halogen atom other than fluorine in the organic compound is favored. Antimony fluorochlorides containing 6% to 21% fluorine have given especially advantageous results. The proportions of pentavalent and trivalent antimony may be varied over essentially the entire possible range, according to the results desired. A preferred pentavalent antimony halide range is 70% to 90% by weight of the total antimony catalyst, especially when it is desired to produce completely halogenated fluoro-halo compounds. Higher proportions of trivalent antimony halide favor the production of fluoro compounds containing hydrogen.

As stated above, it is ordinarily of advantage to have the antimony-containing reaction mass in liquid condition. This physical state may be maintained by various means, such as by having present an inert material (for example, a previously fluorinated compound liquid at the temperatures employed, a highly halogenated aryl compound or the like). Other means include having present an excess of the acyclic halogen compound being fluorinated, some of that having been fluorinated, or a trivalent antimony compound.

The temperature at which the reaction is effected may be varied over a wide range, depending largely upon the nature of the material to be fluorinated, the catalyst and the desired degree of fluorination. With antimony halide catalysts in liquid phase the reaction of hydrogen fluoride and substances such as carbon tetrachloride takes place rapidly at the ordinary temperature of the room, and appreciably so at 0° C. The upper limit is normally that of the boiling temperature of the antimony catalyst. The preferred temperature range for the production of substances such as difluorodichloromethane lies between 45° C. and 95° C. While the degree of fluorination may vary with the amount of hydrogen fluoride introduced into the antimony halide, for catalysts of the same fluorine content low temperatures tend to produce less highly fluorinated products than higher temperatures. The formation of higher fluorinated hydrocarbons increases above about 95° C. under super-atmospheric pressures.

With antimony chloride catalysts satisfactory results have been obtained in the use of temperatures as high as 225° C. Higher temperatures which do not cause decomposition of the reactants or products may be used. For the production of trifluorotrichloroethane temperatures around 100° C. are satisfactory; for the production of fluorinated methanes and fluorinated ethanes containing more than two atoms of fluorine per carbon atom, it is preferable to employ temperatures of at least 125° C. and especially desirable results have been obtained in the use of temperatures of about 150° C. to 175° C.

In general, where the metal halide catalyst is fixed on a relatively inert support such as porous fused alumina, carbon tetrachloride is preferably fluorinated in accordance with the invention at a temperature of about 250° C. to 450° C. and trifluorotrichloroethane at about 450° C. to 550° C. Where the catalyst is fixed on a support such as activated carbon, which in itself is catalytically active, it has been found, as already indicated, that lower temperatures give very desirable results. The results obtained at a given temperature will naturally vary with the specific metal halide employed. Generally speaking, in the case of catalysts impregnated or fixed on an adsorptive carbon such as activated carbon, chloroform and carbon tetrachloride are preferably fluorinated at a temperature of about 100° C. to 200° C., and trifluorotrichloroethane at about 350° C. to 450° C. It will be understood that these temperatures are preferred temperatures for conditions and reactions described and do not represent the minimum or maximum temperatures at which reaction will occur.

The pressure may be that of the atmosphere, or it may be sub-atmospheric or super-atmospheric. The pressure may be adapted to the boiling temperatures of the components or products. For the production of the low-boiling products, the use of super-atmospheric pressures may be of an advantage; for that of high-boiling products the use of sub-atmospheric pressures may be found to be advantageous. Super-atmospheric pressures are very desirable, for example, in the production of highly fluorinated bodies, particularly in the use of antimony halide catalysts in the liquid phase. Under some temperature conditions, super-atmospheric pressures of 5 to 10 pounds per square inch (gauge) have been used. Generally speaking, in the use of antimony halide catalysts in the liquid phase at temperatures above about 125° C., it is preferable to employ pressures within the range of 40 to 200 pounds per square inch. Higher pressures may be used. In the production of polyfluorochloro-hydrocarbons containing less than three carbon atoms, especially desirable results have been obtained in the use of pressures of about 60 to 155 pounds per square inch, over a temperature range of 150° C. to 175° C. in the presence of antimony halides in liquid phase.

Super-atmospheric pressures are also particularly advantageous in fluorinating compounds which split off a halogen acid at elevated temperatures. Operation under super-atmospheric pressure is also advantageous in that it allows a greater capacity per unit volume of catalyst.

The reaction and the separation or isolation of the products by distillation, fractional or otherwise, may be carried out simultaneously or in separate steps. In the latter case, it is not necessary that the pressures of the two steps be the same.

The physical state in which the hydrogen fluoride or the organic halogen derivative is added is not especially important. The means illustrated in the examples afford the easiest control. The two components, if desired, may be added in one stream. For example, the hydrogen fluoride gas may be passed through the liquid acyclic halogen derivative on its way into the reactor.

Where the hydrogen fluoride and organic halogen derivative are added to the catalyst as gases, it will be understood that the pressure and temperature conditions may be such as to change either or both to the liquid phase. Thus, hydrogen fluoride is a liquid at a temperature of 80° C. under a pressure of about 65 pounds per square inch.

The invention herein disclosed has the advantage of greatly reducing the capital expenditure heretofore necessary for fluorination processes. In addition, the costs of operation are also reduced. The difficulties of handling toxic, corrosive and unstable materials have been overcome to a very desirable degree.

The products of the invention are useful for various commercial purposes. Many of the products have desirable refrigerating properties. Thus, difluorodichloromethane is widely used as a refrigerant. Fluorotrichloromethane, fluorodichloromethane, fluorochloromethane and tetrafluorodichloroethane are likewise well adapted for use as a refrigerant. Pentafluorochloroethane also possesses very desirable properties for low temperature refrigeration. Some of the higher boiling compounds such as trifluorotrichloroethane and fluorotrichloromethane are generally applicable for use as solvents and reaction media. Moreover, many of the products investigated have been found to be advantageous in that they are odorless, non-inflammable, non-corrosive and non-toxic.

So much of this application as relates to the fluorination of halogenated methanes containing two hydrogen atoms is claimed in our co-pending application Serial No. 730,842 filed June 15, 1934 issued as Patent No. 2,005,711 on June 18, 1935. The fluorination of halogenated methanes containing one hydrogen atom, such as chloroform, is claimed in our co-pending application Serial No. 483,289 filed September 20, 1930 issued as Patent No. 2,005,705 on June 18, 1935.

As many apparently widely different embodiments of this invention may be made without departing from the spirit and scope thereof, it is to be understood that we do not limit ourselves to the specific embodiments thereof except as defined in the following claims.

We claim:

1. In a process of producing carbon compounds containing fluorine, the step which comprises reacting together hydrogen fluoride and a compound containing at least one acyclic carbon atom having attached thereto at least one hydrogen atom and at least one halogen atom other than fluorine.

2. In a process of producing carbon compounds containing fluorine, the step which comprises reacting together hydrogen fluoride and a halogenated acyclic hydrocarbon containing at least one atom of hydrogen and at least one halogen atom other than fluorine, under super-atmospheric pressure.

3. The process of claim 2 in which the halogenated acyclic hydrocarbon contains at least two carbon atoms and in which all the halogen other than fluorine is attached to one of the carbon atoms.

4. The process of claim 2 in which the halogenated acyclic hydrocarbon contains at least two carbon atoms and in which one carbon atom has no halogen attached.

5. In a process of producing carbon compounds containing fluorine, the step which comprises reacting together hydrogen fluoride and a halogenated acyclic hydrocarbon containing at least one atom of hydrogen and at least one halogen atom other than fluorine, in the presence of added free halogen.

6. In a process of producing carbon compounds containing fluorine, the step which comprises reacting together hydrogen fluoride and a halogenated acyclic hydrocarbon containing at least one atom of hydrogen and at least one halogen atom other than fluorine, in the presence of a fluorinating catalyst.

7. In a process of producing carbon compounds containing fluorine, the step which comprises reacting together hydrogen fluoride and a halogenated acyclic hydrocarbon containing at least one atom of hydrogen and at least one halogen atom other than fluorine, in the presence of a heavy metal halide.

8. In a process of producing carbon compounds containing fluorine, the step which comprises reacting together hydrogen fluoride and a halogenated acyclic hydrocarbon containing at least one atom of hydrogen and at least one halogen atom other than fluorine, in the presence of a pentavalent antimony halide containing fluorine and another halogen.

9. The process of preparing fluorine derivatives of acyclic hydrocarbons which comprises treating a mixture of inert diluent and a pentavalent antimony halide with substantially anhydrous hydrogen fluoride and a halogenated acyclic hydrocarbon containing at least one atom of hydrogen and at least one halogen atom other than fluorine.

10. In a process of producing carbon compounds containing fluorine, the step which comprises bringing together hydrogen fluoride and a halogenated acyclic hydrocarbon containing at least one hydrogen atom and at least one chlorine atom into contact with a catalyst containing a composition represented empirically by $$SbF_xCl_{5-x}$$

in which $x$ represents a positive value less than 3.

11. In a process of producing carbon compounds containing fluorine, the step which comprises bringing together hydrogen fluoride, chlorine and a halogenated acyclic hydrocarbon containing at least one hydrogen atom and at least one chlorine atom into contact with a catalyst containing a composition represented empirically by $$SbF_xCl_{5-x}$$

in which $x$ represents a positive value less than 3.

12. The process of producing fluorine derivatives of acyclic hydrocarbons which comprises treating a composition represented empirically by $$SbF_xHal_{5-x}$$

where $x$ is a positive value less than 3 and Hal represents a halogen other than fluorine, with hydrogen fluoride and a halogenated acyclic hydrocarbon containing at least one hydrogen atom and at least one halogen atom other than fluorine.

13. The process which comprises treating an antimony pentahalide with hydrogen fluoride and, without further treatment, adding a halogenated acyclic hydrocarbon containing at least one hydrogen atom and at least one halogen atom other than fluorine to produce a fluorine derivative of said hydrocarbon.

14. The process of preparing fluorine derivatives of acyclic hydrocarbons which comprises treating a mixture of an antimony pentahalide and an antimony trihalide with hydrogen fluoride and a halogenated acyclic hydrocarbon containing at least one hydrogen atom and at least one halogen atom other than fluorine.

15. In a process of producing fluorine derivatives of acyclic hydrocarbons containing two carbon atoms, the step which comprises reacting together hydrogen fluoride and a halogenated acyclic hydrocarbon containing two carbon atoms, at least one hydrogen atom and at least one halogen atom other than fluorine, in the presence of a pentavalent antimony halide containing fluorine and a halogen other than fluorine.

16. In a process of producing fluorine derivatives of acyclic hydrocarbons containing two carbon atoms, the step which comprises reacting together hydrogen fluoride and a halogenated acyclic hydrocarbon containing two carbon atoms, at least one hydrogen atom and more than one chlorine atom, in the presence of a pentavalent antimony halide containing fluorine and chlorine.

17. In a process of producing fluorine derivatives of acyclic hydrocarbons containing two carbon atoms, the step which comprises reacting together hydrogen fluoride and a halogenated acyclic hydrocarbon containing two carbon atoms, at least one hydrogen atom and more than one chlorine atom, in the presence of a pentavalent antimony halide containing fluorine and chlorine, at a temperature above about 125° C.

18. In a process of producing fluorine derivatives of acyclic hydrocarbons containing two carbon atoms, the step which comprises reacting together hydrogen fluoride and a halogenated acyclic hydrocarbon containing two carbon atoms, at least one hydrogen atom and more than one chlorine atom, in the presence of a pentavalent antimony halide containing fluorine and chlorine at a temperature above about 125° C. under super-atmospheric pressure.

19. In a process of producing halogenated ethane derivatives containing fluorine, the step which comprises bringing together hydrogen fluoride and tetrachloroethane, in the presence of a pentavalent antimony halide containing fluorine and chlorine.

20. The process of claim 19 in which the reaction is effected at a temperature between about 95° C. and about 225° C. under super-atmospheric pressure.

21. The process of claim 1 in which the reaction is effected without changing the number of hydrogen atoms in the molecule of the compound being fluorinated.

22. The process of claim 7 in which the reaction is effected without changing the number of hydrogen atoms in the molecule of the compound being fluorinated.

23. The process of claim 10 in which the reaction is effected without changing the number of hydrogen atoms in the molecule of the compound being fluorinated.

24. The process of claim 1 in which the reaction involves the introduction of fluorine and the substitution of hydrogen by halogen in halogenated hydrocarbons containing hydrogen and at least one halogen atom other than fluorine.

25. The process of claim 5 in which the reaction involves the introduction of fluorine and the substitution of hydrogen by halogen in halogenated hydrocarbons containing hydrogen and at least one halogen atom other than fluorine.

26. The process of claim 11 in which the reaction involves the introduction of fluorine and the substitution of hydrogen by halogen in halogenated hydrocarbons containing hydrogen and at least one halogen atom other than fluorine.

HERBERT WILKENS DAUDT.
MORTIMER ALEXANDER YOUKER.